United States Patent [19]

Bartos

[11] Patent Number: 4,800,923

[45] Date of Patent: Jan. 31, 1989

[54] PORTABLE EMERGENCY BREATHING APPARATUS

[75] Inventor: Josef A. Bartos, Diamond Bar, Calif.

[73] Assignee: Respirator Research, Ltd., Willoughby, Ohio

[21] Appl. No.: 128,985

[22] Filed: Dec. 4, 1987

Related U.S. Application Data

[62] Division of Ser. No. 762,251, Aug. 5, 1985, Pat. No. 4,722,333.

[51] Int. Cl.[4] .............................................. F16K 31/12

[52] U.S. Cl. ...................................... 137/613; 137/501

[58] Field of Search ................................ 137/501, 613

[56] References Cited

U.S. PATENT DOCUMENTS

| | | | |
|---|---|---|---|
| 611,519 | 9/1898 | Simmance | 137/501 |
| 1,767,201 | 6/1930 | Boynton | 137/501 |

FOREIGN PATENT DOCUMENTS

| | | | |
|---|---|---|---|
| 26615 | of 1912 | United Kingdom | 137/501 |
| 2003257 | 3/1979 | United Kingdom | 137/501 |

*Primary Examiner*—A. Michael Chambers

*Attorney, Agent, or Firm*—Body, Vickers & Daniels

[57] ABSTRACT

Portable emergency breathing apparatus is disclosed which is comprised of a unitary, generally flat manifold having opposite ends and top and bottom sides and a manifold passageway between the opposite ends. Three parallel, laterally juxtaposed compressed gas containers are mounted on the bottom side of the manifold by means of coupling components extending through the manifold from the top side and into internally threaded necks of the containers. Each of the coupling components provides flow communication between the interior of the corresponding container and the manifold passageway, and a shut-off and pressure reducing valve assembly is mounted on the manifold between two of the containers. The valve assembly has upper and lower portions respectively adjacent the top and bottom sides of the manifold with the lower portion disposed in the space between the necks of the two adjacent containers. The valve assembly controls the flow of gas from the containers to a breathing hose connected to an outlet passageway of the valve assembly and leading to a hood or mask worn by the user of the apparatus.

13 Claims, 5 Drawing Sheets

FIG. 2
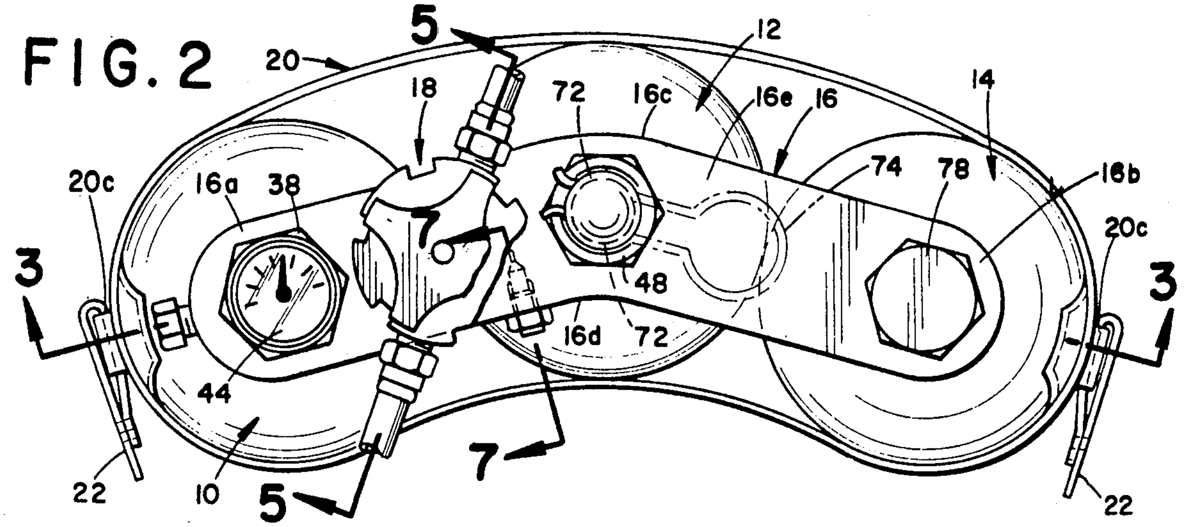
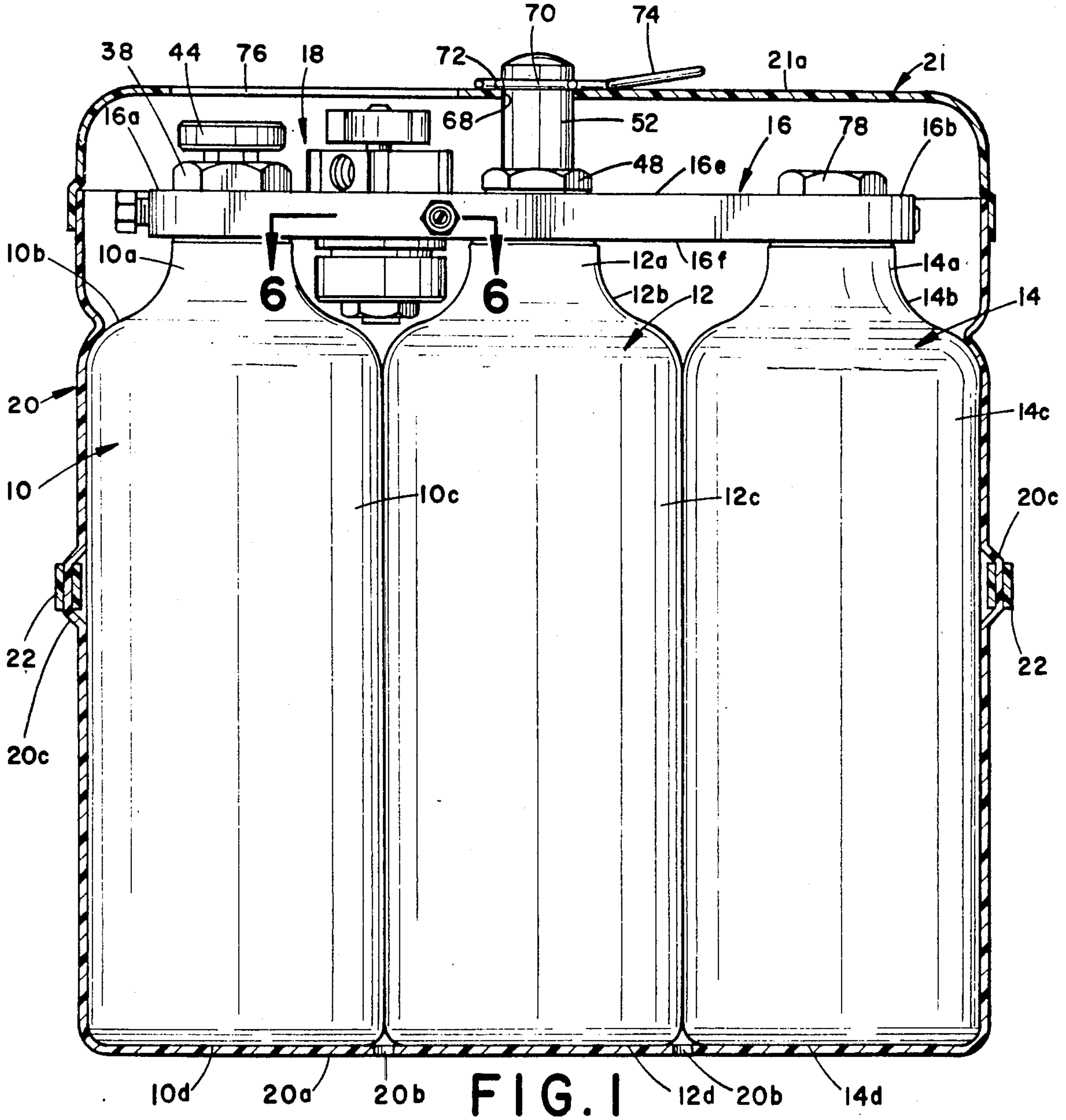
FIG. 1

PORTABLE EMERGENCY BREATHING APPARATUS

This is a division of application Ser. No. 762,251, filed Aug. 5, 1985, now U.S. Pat. No. 4,722,333.

BACKGROUND OF THE INVENTION

The present invention relates to the art of portable emergency breathing apparatus and, more particularly, to improvements in connection with breathing apparatus of the character in which breathing gas from a source is continuously supplied at a controlled rate to the user.

Breathing apparatus of the character in which oxygen from a source such as a compressed oxygen container is continuously supplied at a controlled rate to a hood or face mask worn by the user is generally referred to as open circuit apparatus in that the gas breathed by the user from the tank is exhaled to atmosphere. Such exhaling to atmosphere distinguishes the open circuit apparatus from apparatus generally known as closed circuit apparatus wherein the exhaled breath of the user is mixed with oxygen from a supply container, scrubbed to reduce the concentration of exhaled carbon dioxide, and re-breathed by the user. While closed circuit apparatus has the advantage of optimizing the duration of use with a given sized oxygen supply container, such apparatus is expensive, bulky and has exposed component parts which are subject to easy damage whereby they are undesirable in certain environments of potential use such as in airplanes, for example, where a large number of units must be stored and storage space is at a premium and where the total weight of the units to be stored is a major consideration. A major disadvantage of open circuit apparatus heretofore available has been the size of the breathing gas supply container or containers necessary to provide a given duration of use. Thus, while open circuit units have fewer component parts and may be less expensive, the same problems with respect to acceptance of the apparatus in a given environment exists with respect to the size and weight of a unit.

In addition to the foregoing disadvantages of a closed circuit system, there are potential life endangering situations wherein the longer duration provided by such apparatus is not necessary, whereby the use of the shorter duration but less expensive open circuit apparatus could be acceptable and possibly preferable. It remains, however, that with the open circuit apparatus heretofore available the overall size and weight of the apparatus necessary to provide a given duration of use is excessive and does not resolve the problems encountered in connection with use in environments wherein weight and storage space are major concerns.

SUMMARY OF THE INVENTION

In accordance with the present invention, open circuit emergency breathing apparatus is provided wherein a plurality of breathing gas supply containers are structurally interrelated with one another and with a flow control valve arrangement in a manner which provides a light weight, compact unit having an optimum duration of use capability relative to its overall size. More particularly in this respect, a plurality of supply containers are structurally mounted on a manifold in parallel, side-by-side relationship. The manifold and mounting arrangement provides for the interior of each of the containers to be in flow communication with a flow passageway in the manifold, and minimizes the overall lateral and vertical dimension of the apparatus. A flow control valve is also mounted on the manifold to control the supply of breathing gas from the containers to an air hose which leads to a mask or hood to be worn by a user.

In accordance with a preferred embodiment, the manifold is a unitary member, and the valve is an assembly mounted on the manifold between adjacent supply containers and structured for a portion of the valve assembly to occupy the space between necked portions of the adjacent containers. This optimizes compactness of the unit and promotes both economy of production and lightness in weight by minimizing the number of component parts. Further in connection with the preferred embodiment, three compressed gas cylinders are laterally juxtaposed in an arcuate configuration, and the three containers are preferably received in a closely fitting external jacket having a removable cover. The cover overlies the component part at the top of the unit and the air hose and hood or mask components are stored beneath the cover whereby, in connection with storage of the apparatus, there are no exposed parts susceptible to damage. Moreover, when the cover is removed so as to enable the unit to be supported on a user, such as by a body strap, there is minimum exposure of component parts which would be susceptible to damage during use.

It is accordingly an outstanding object of the present invention to provide an improved portable, emergency breathing apparatus of the open circuit type.

Another object is the provision of apparatus of the foregoing character which, for a given quantity of stored breathing gas, is more compact than open circuit apparatus heretofore available.

Another object is the provision of apparatus of the foregoing character wherein a plurality of supply containers are structurally interrelated with one another and with a common manifold and flow control valve to provide an open circuit unit which is lighter in weight and comprised of fewer component parts than units heretofore available having a comparable duration of use.

A further object is the provision of apparatus of the foregoing character wherein the supply containers, manifold and flow control valve minimize the vertical height and lateral width of the unit while optimizing the capacity of the unit with respect to duration of use.

Still another object is the provision of apparatus of the foregoing character wherein the flow control valve is an assembly of component parts structurally interrelated with the manifold and compressed gas containers to optimize the use of available space between the containers so as to minimize the vertical height of the unit and the exposure of component parts during use.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which:

FIG. 1 is an elevation view of portable emergency breathing apparatus in accordance with the present invention and showing the external jacket and cover in section:

FIG. 2 is a plan view of the apparatus shown in FIG. 1 with the cover removed:

DESCRIPTION OF A PREFERRED EMBODIMENT

Figure 3:
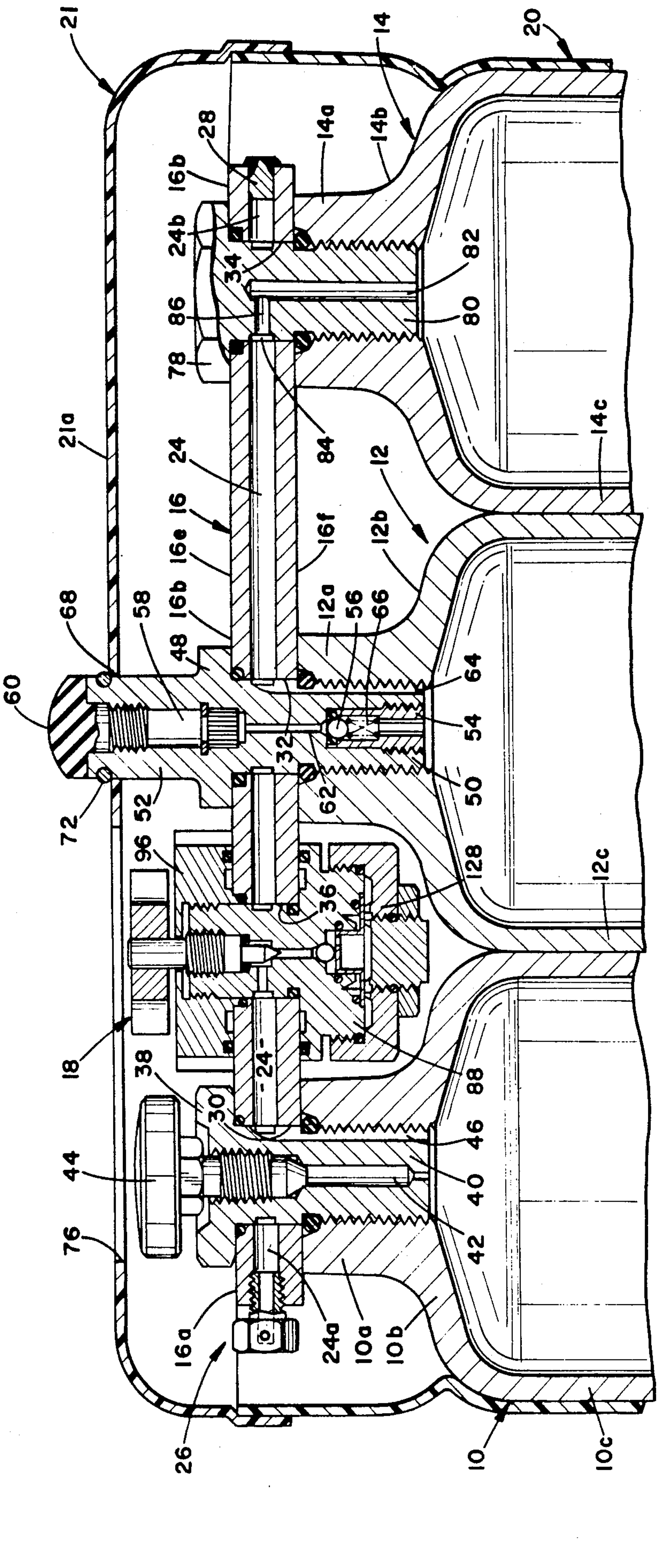
FIG. 3 is a sectional elevation view of the upper portion of the apparatus taken along line 3—3 in FIG. 2.

With reference now in greater detail to the drawings wherein the showings are for the purpose of illustrating a preferred embodiment of the invention only, and not for the purpose of limiting the invention, portable emergency breathing apparatus according to the present invention comprises a plurality of compressed gas containers in the form of cylinders 10, 12 and 14 mounted on a common manifold 16 together with a shutoff and pressure reducing valve assembly 18 which, as will be described more fully hereinafter,controls the flow of breathing gas from the cylinders to a breathing hose leading to a face mask or hood. Preferably, the breathing apparatus thus defined is received within a close fitting, thin walled jacket 20 of suitable metal or plastic which has a bottom wall 20*a* provided with vent holes 20*b*, and an open upper end which, during periods of storage of the unit, is closed by a removable cover 21. The apparatus is adapted to be strapped to the body of a user and, for this purpose in the embodiment illustrated, jacket 20 is provided with integral strap supports 20*c* on opposite sides thereof and each of which receives the end of a body strap 22 which is turned back and secured to itself such as by stitching. The free ends of straps 22, not shown, are adapted to be fastened together to hold the apparatus in place against the user's body.

Cylinders 10, 12 and 14 are of identical structure and in this respect include corresponding internally threaded neck portions 10*a*, 12*a* and 14*a* at the upper ends thereof, outwardly and downwardly flaring skirt portions 10*b*, 12*b* and 14*b*, cylindrical side walls 10*c*, 12*c* and 14*c*, and closed bottoms 10*d*, 12*d* and 14*d*. Manifold 16 is a generally flat metal member having longitudinally opposite ends 16*a* and 16*b*, laterally opposite sides 16*c* and 16*d*, a top side 16*e* and a bottom side 16*f*. Further manifold 16 is provided with a longitudinally extending manifold passageway 24 which is generally centrally between the laterally opposite sides of the manifold and which has opposite ends 24*a* and 24*b* respectively closed by a safety relief or brust valve 26 and a plug 28 which is welded or otherwise secured in the corresponding end of the passageway. Manifold 16 is further provided with cylinder mounting openings 30, 32 and 34, and a flow control valve mounting opening 36, each of which openings extends through the manifold from the top to the bottom side thereof and has an axis transverse to and intersecting the axis of manifold passageway 24. As described more fully hereinafter, openings 30, 32 and 34 respectively facilitate the mounting of cylinders 10, 12 and 14 on the manifold, and opening 36 facilitates the mounting of shutoff and pressure reducing valve assembly 18 on the manifold.

As best seen in FIG. 3, the upper end of neck 10*a* of cylinder 10 engages against bottom side 16*f* of the manifold and is secured thereagainst by a mounting member having a head portion 38 engaging against top side 16*e* of the manifold and an externally threaded stem portion 40 extending through mounting opening 30 and threadedly interengaging with internally threaded neck 10*a*. In the embodiment illustrated, head 38 and stem 40 are provided with a through passageway 42 which facilitates mounting a pressure gauge 44 on the mounting member which, as will become apparent hereinafter, provides a readout for the pressure of the breathing gas in cylinders 10, 12 and 14. Further, stem 40 is provided with an axially extending external passageway 46 which communicates the interior of cylinder 10 with manifold passageway 24. It will be appreciated that suitable sealing ring members, not designated numerically, are interposed between neck 10*a* and bottom side 16*f* of the manifold and between head 38 and the top side 16*e* of the manifold to seal against the leakage of gas from the apparatus at the point of connection of cylinder 10 to the manifold.

As will also be seen in FIG. 3, the upper end of neck portion 12*a* of cylinder 12 abuts against bottom side 16*f* of the manifold and is securely mounted thereon by means of a mounting member having a head 48 engaging against top side 16*e*, an externally threaded lower stem portion 50 extending through mounting opening 32 and threadedly interengaging with internally threaded neck portion 12*a*, and an outer stem portion 52 extending upwardly from head 48. This mounting member is provided with a through passageway having an inner portion 54 which supports a spring biased check valve 56, an outer portion 58 provided with a resilient closure plug 60, and an intermediate portion 62 between portions 54 and 58. Further, lower stem portion 50 is provided with an axially extending external passageway 64 which communicates the interior of cylinder 12 with manifold passageway 24. As described above in connection with the mounting of cylinder 10 on the manifold, it will be appreciated that appropriate seal rings, not designated numerically, are provided between cylinder 12, the mounting member therefor and manifold 16 to prevent the escape of gas from the apparatus.

In the embodiment illustrated, the mounting member for cylinder 12 also functions to facilitate the retention of cover 22 on jacket 20, and to provide a fill port for cylinders 10, 12 and 14. More particularly in this respect, check valve 56 is biased by means of a spring 66 to close the inner end of intermediate passageway 62 against the flow of gas from the cylinders to atmosphere through outer passageway 58. By removing plug 60 which functions to close the passageway against the ingress of dirt and other foreign matter, breathing gas under pressure can be introduced into outer passageway portion 58 to flow past check valve 56 into cylinder 12. As will become apparent hereinafter, cylinders 10, 12 and 14 are in flow communication with one another at all times, whereby gas supplied to cylinder 12 in the foregoing manner flows through the manifold passageway to fill cylinder's 10 and 14. The outer end of outer stem portion 52 extends through a circular opening 68 in top wall 21*a* of cover 21 and is provided with a circumferentially extending recess 70 which receives the appropriately contoured legs 72 of a wire spring clip member which, as shown in phantom in FIG. 2, includes a closed end 74 in the form of a loop overlying top wall 21*a* to hold the cover in place. Loop 74 facilitates grasping the spring clip and pulling the clip from stem portion 52 to release the cover for removal. Preferably, cover 21 is further provided with an opening 76 overlying pressure gauge 44 and the outer end of shutoff and pressure reducing valve assembly 18 to facilitate determining the pressure of gas in the cylinders and access to the valve for test purposes without having to remove cover 21.

With further reference to FIG. 3, it will be seen that neck portion 14*a* of cylinder 14 abuts against bottom side 16*f* of the manifold and is mounted thereagainst by a mounting member having a head 78 engaging against top side 16*e* of the manifold and an externally threaded stem 80 which extends through mounting opening 34 and into threaded engagement with internally threaded neck portion 14*a*. The interior of cylinder 14 is in communication with manifold passageway 24 by means of an axially extending passageway 82 in stem 80, a circumferentially continuous recess 84 which is in the exterior of stem 80 and in vertical alignment with manifold passageway 24, and a radial passageway 86 which extends between recess 84 and passageway 82. Again, while not designated numerically, it will be appreciated that appropriate seal rings are interposed between neck portion 14*a* of the cylinder and between the mounting member and manifold to prevent the leakage of gas from the apparatus.

Figure 4:
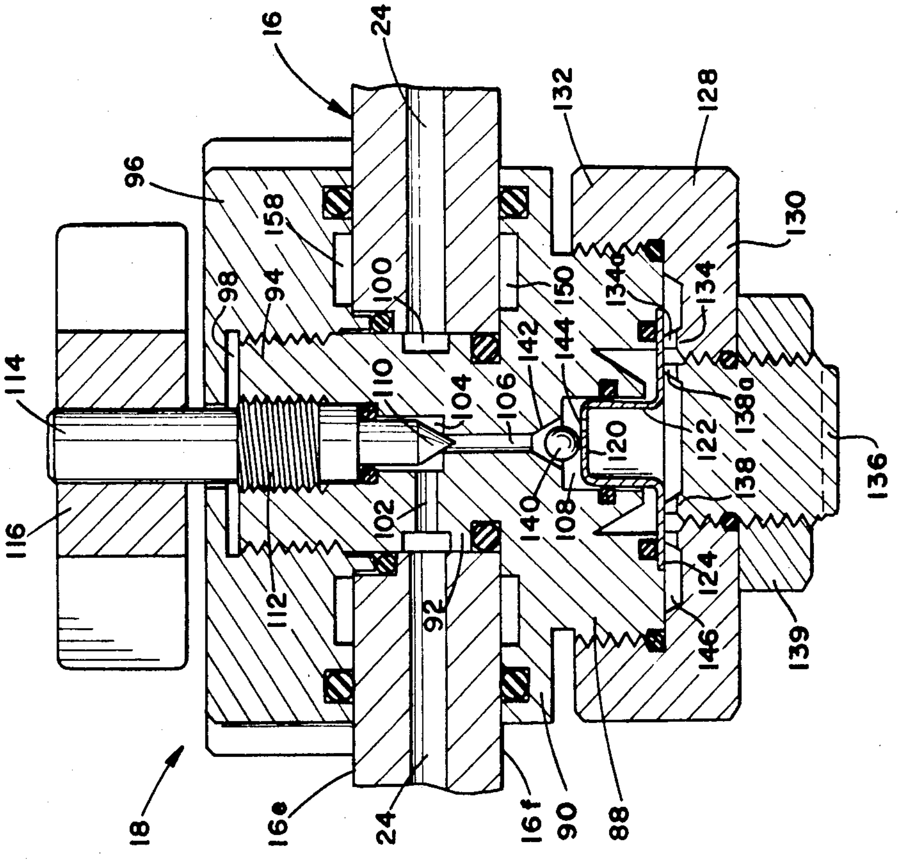
FIG. 4 is an enlarged sectional elevation view of the shutoff and pressure reducing valve shown in FIG. 3.
Figure 5:
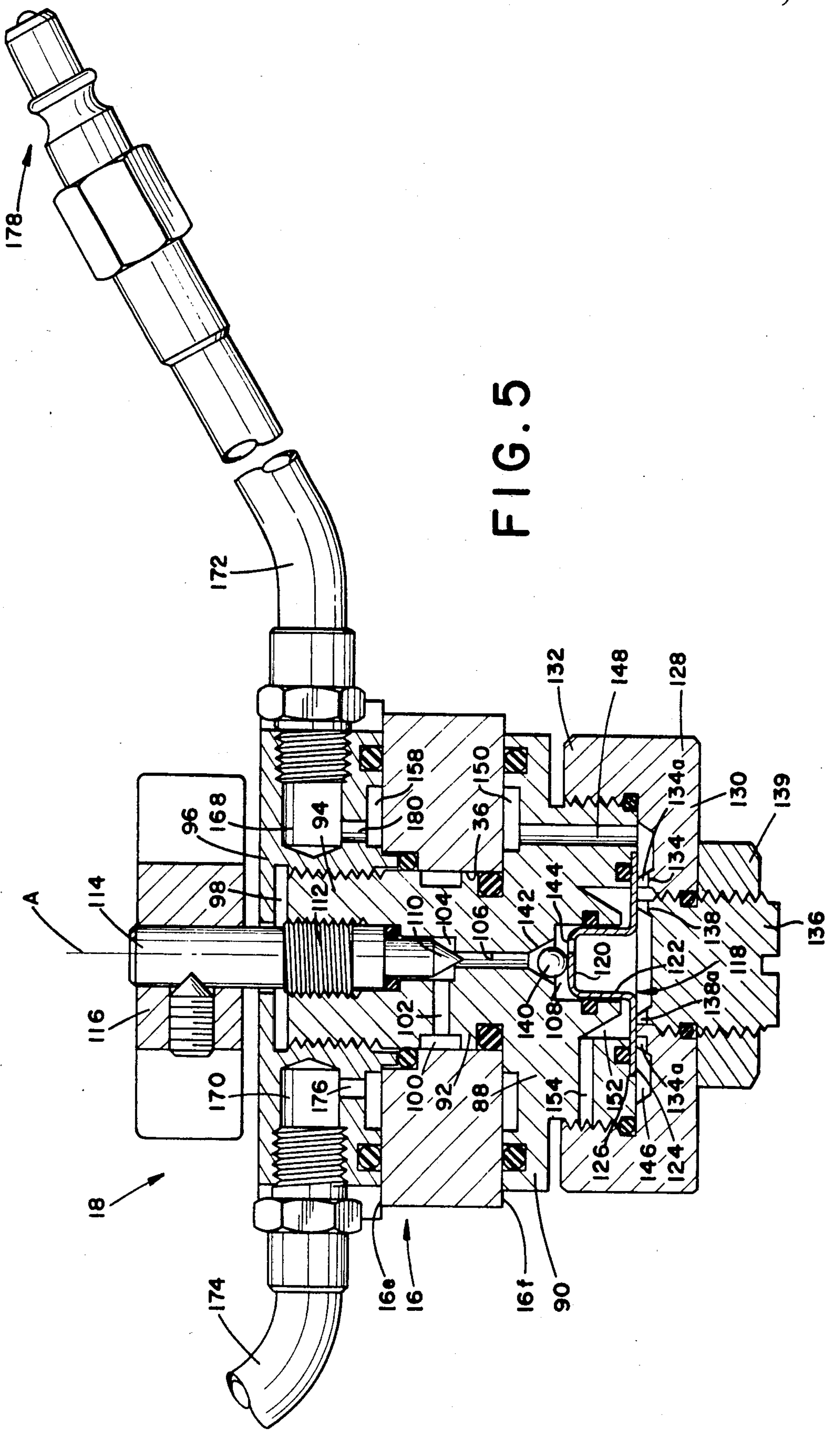
FIG. 5 is an enlarged sectional elevation view of the shutoff and pressure reducing valve taken along line 5—5 in FIG. 2.

Referring now in particular to FIGS. 3, 4 and 5 of the drawing, the shutoff and pressure reducing valve assembly 18 is comprised of a first circular body member 88 which is generally T-shaped in vertical cross-section to provide a flange 90 underlying bottom side 16*f* of manifold 16 and a central portion 92 extending upwardly through mounting opening 36. Central portion 92 has an externally threaded upper end 94 disposed above top side 16*e* of the manifold and the valve assembly includes a second body member 96 having an internally threaded central recess 98 by which the second body member is threadedly interengaged with the threaded upper end 94 of the first body member to mount valve assembly 18 on manifold 16. Valve assembly 18 is provided with a gas flow passageway therethrough which includes an inlet end defined by a circumferentially continuous recess 100 in central portion 92 and which is in vertical alignment with manifold passageway 24. The flow passageway further includes a port 102 extending radially inwardly from recess 100 and opening into a central shutoff valve chamber 104 which is coaxial with axis A of the valve assembly. An axially extending port 106 has its upper end opening into chamber 104 and its lower end opening into a diaphragm chamber 108, and a conical shutoff valve element 110 is adapted to seat in the upper end of port 106 as shown in the drawings to close the flow passageway at a point downstream from the inlet end thereof. Valve element 110 is on the inner end of a valve stem having an externally threaded intermediate portion 112 in threaded engagement with an internally threaded bore in upper end 94 of body member 88, whereby rotation of the valve stem operates to displace valve element 110 toward and away from seating engagement with port 106. For rotating the valve stem, outer end 114 of the stem extends through an opening therefor in second body member 96 and is provided with a suitable operating knob 116.

A sheet metal hat-shaped diaphragm 118 is disposed in diaphragm chamber 108 and is comprised of a generally flat circular end wall 120 at the upstream end of the chamber and adjacent the lower end of port 106, a cylindrical side wall 122, and a radially outwardly extending circumferential flange 124. The radially outer end of flange 124 is disposed in a recess 126 provided therefor in the lower end of body member 88. Diaphragm 118 is mounted on body member 88 by means of a cap member 128 having an end wall 130 and an axially extending internally threaded annular skirt portion 132 which surrounds and threadedly interengages with the externally threaded lower end of body member 88. End wall 130 is provided on the inner side thereof with a circular rib 134 which axially engages the radially outer end of diaphragm flange 124 against the lower end of body member 88. Further, end wall 130 is provided with an internally threaded central bore which receives an externally threaded diaphragm adjusting screw 136 provided on its inner end with a circular rib 138 which axially engages against diaphragm flange 124 radially inwardly of rib 134. Rotative displacement of adjusting screw 136 axially displaces rib 138 toward and away from diaphragm flange 124, thus to enable adjustment of the pressure reducing portion of the valve assembly to provide a desired pressure of air flow at the outlet end of the air flow passageway as will be described hereinafter. A lock nut 139 provides for retaining adjusting screw 136 in the desired position thereof.

A ball valve 140 is interposed between end wall 120 of diaphragm 118 and the lower end of port 106 which is flared as designated- by numeral 142 to provide a seat by which ball valve 140 is adapted to close the lower end of port 106. The gas flow passageway through body member 88 of the valve assembly further includes a port 144 in end wall 120 of the diaphragm, a plurality of radially extending ports 138*a* in rib 138 of adjusting screw 136, a plurality of radially extending ports 134*a* in rib 134 of cap member 128, a circumferentially continuous axially extending recess 146 on the inner side of end wall 130 of cap member 128, an axially extending port 148 in the lower end of body member 88, and a circumferentially continuous recess 150 in the upper side of flange 90 of body member 88. The diaphragm and diaphragm chamber are appropriately sealed against the leakage of gas across the outer surface offside wall 122 and the upper surface of flange 124 by seal rings, not designated numerically, interposed between the diaphragm chamber and outer side of side wall 122 and between flange 124 and the lower end of body member 88. The corresponding side of the diaphragm between the latter seals is vented to atmosphere by means of a circumferentially extending cavity 152 and a radially extending port 154 having an inner end communicating with cavity 152 and an outer end opening into the threads between body member 88 and cap member 128.

Figure 6:
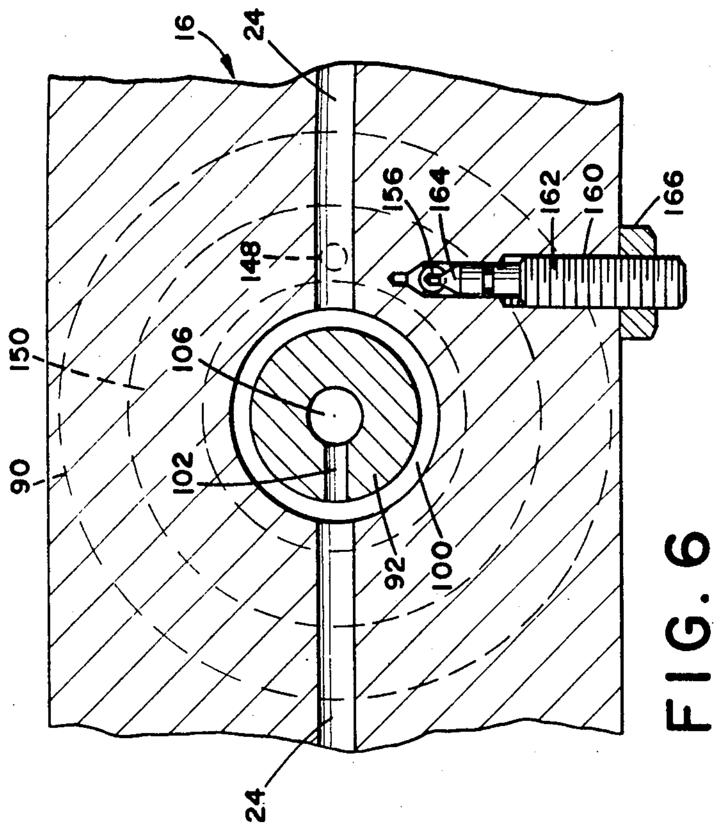
FIG. 6 is a cross-sectional view of the manifold and the shutoff and pressure reducing valve taken along line 6—6 in FIG. 1.
Figure 7:
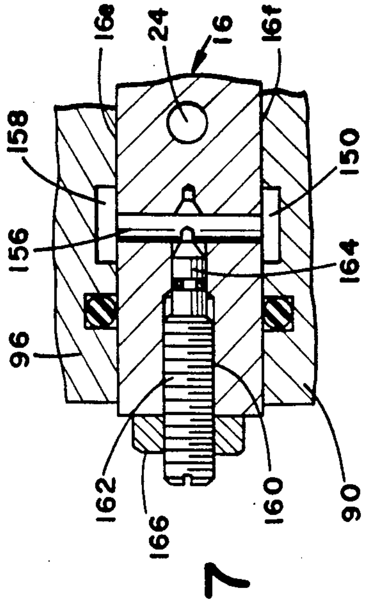
FIG. 7 is a cross-sectional elevation view of the flow restricting valve of the apparatus taken along line 7—7 in FIG. 2: and, FIG. 8 is a sectional elevation view of another embodiment of the pressure reducing valve assembly.

As best seen in FIGS. 2, 6 and 7 of the drawing, the gas flow passageway through the valve assembly further includes a port 156 extending vertically through manifold 16 in laterally offset relationship with respect to manifold passageway 24 and in radially spaced relationship with respect to valve axis A such that the lower end of port 156 opens into recess 150 in flange 90. The gas flow passageway further includes a circumferentially continuous recess 158 in the inner side of second body member 96 and into which the upper end of port 156 opens. Manifold 16 is provided with a laterally inwardly extending threaded bore 160 receiving an externally threaded valve stem 162 having a valve element 164 on the inner end thereof which is operable through rotative adjustment of stem 162 to restrict the flow of gas through port 156. A lock nut 166 provides for locking the restricting valve in a desired position. This valve serves the purpose set forth hereinafter in conjunction with controlling the flow of gas to the outlet end of the gas flow passageway through the valve assembly.

In the embodiment illustrated, second valve body member 96 is provided with diametrically opposed radially extending bores 168 and 170 receiving opposed fittings by which the bores are respectively coupled to a gas supply hose 172 and a breathing hose 174. Hose 174 leads to a face mask or hood, not shown, to be worn by a user of the breathing apparatus, and the inner end of bore 170 communicates with recess 158 in body member 96 by means of an axial port 176, whereby bore 170 provides the outlet end of the air flow passageway through the valve assembly. Supply hose 172 is provided with a quick connect coupling 178 on its outer end for connection to a source of breathing gas external to the apparatus under the circumstances and for the purpose set forth hereinafter, and bore 168 communicates with recess 158 in second body member 96 by means of a port 180 therebetween. While not shown in detail, it will be appreciated that coupling 178 includes a check valve which prevents the flow of gas from valve assembly 18 through hose 172 and coupling 178. Further, while not designated numerically, it will be appreciated that appropriate seals are provided between the component parts of the valve assembly and manifold to prevent the escape of gas from the apparatus.

It is believed hat the following description of the operation of the apparatus will be understood from the foregoing description of the structure and structural interrelationship between the component parts of the apparatus. Presuming cylinders 10, 12 and 14 to be empty, plug 60 is removed from the upper end 52 of the mounting member for cylinder 12 and a source of breathing gas under pressure is coupled therewith to facilitate filling cylinders 10, 12 and 14 with gas at a desired pressure. More particularly in this respect, the flow of gas through port 62 in the mounting member displaces ball valve 56 downwardly from the position thereof shown in FIG. 3 and against the bias of spring 68, whereby gas flows into cylinder 12 and through external passageway 64 in lower end 50 of the mounting member to manifold passageway 24. Also presuming the shutoff valve portion of valve assembly 18 to be closed as shown in the drawings, gas entering manifold passageway 24 from cylinder 12 flows to cylinder 14 through passageways 86 and 82 in the mounting member therefor. The gas also flows into cylinder 10 by way of recess 100 in central portion 92 of valve member 88 and passageway 46 in lower end 40 of the mounting member for cylinder 10. When the gas pressure in cylinders 10, 12 and 14 is at the desired level as visually determinable through pressure gauge 44, the supply gas is disconnected from the outer end of the mounting member for cylinder 12, whereby spring 66 biases check valve 56 to its closed position to preclude the escape of gas from the cylinders.

In connection with the use of the apparatus in an emergency situation, the provision of hose 172 and coupling 178 provides for selective use of the apparatus either with gas supplied from an external source or from cylinders 10, 12 and 14. In this respect, there are situations and environments in which it is possible to connect coupling 178 to a source of gas external to the apparatus and, in connection with use of the apparatus in this manner, the shutoff valve remains closed and the gas supplied through hose 172 flows into chamber 168 and thence through port 180 to circumferential recess 158 and about the latter to port 176, chamber 170 and breathing hose 174. It should be noted at this point that the provision of chamber 168, port 180 and air supply hose 172 is advantageous but not necessary in connection with operation of the apparatus in supplying gas to a hood or mask from the gas supply cylinders 10, 12 and 14. Accordingly, it will be appreciated that the coupling for hose 172 can be removed and the opening to chamber 168 closed by a suitable plug when it is known that the apparatus will not be used in an environment where an external gas supply is available. It will likewise be appreciated that the second valve member 96 can be constructed without provision for connecting such an external gas source thereto.

In connection with use of the apparatus in the mode in which gas is supplied to a hood or mask from cylinders 10, 12 and 14, operating knob 116 is manipulated to displace shutoff valve element 110 upwardly from the position thereof shown in the drawings, thus to open port 106 to the flow of breathing gas from the cylinders through recess 100 and port 102. Gas flowing into and through port 106 flows past ball valve 140 through opening 144 in diaphragm 118 and thence to the downstream side of the diaphragm chamber and radially through ports **138*a* and 134*a* to annular recess 146. From recess 146 the gas flows upwardly through port 148 to annular recess 150 and then upwardly through port 156 past flow restricting valve 164 to annular recess 158 and from the latter recess through port 176 into chamber 170 and through breathing hose 174 to the face mask. The desired rate of gas flow through breathing hose 174 to the face mask is predetermined and is controlled by the position of flow restricting valve 164 and diaphragm 118. More particularly in this respect, the high pressure gas flowing through port 106 into the diaphragm chamber tends to displace the diaphragm downwardly whereby the area between ball valve 140 and seat 142 increases. In contrast, the pressure of gas on the downstream side of the diaphragm tends to displace the diaphragm and ball valve upwardly, thus reducing the area between the ball valve and seat 142. As will be appreciated from FIGS. 4 and 5, gas on the downstream side of the diaphragm acts against end wall 120 and the portion of flange 124 radially inwardly of rib 134*a*, whereas gas on the upstream side of the diaphragm acts only against the area of end wall 120. With this in mind, it will be appreciated that the adjustment of adjusting screw 136 against diaphragm 120 and the restriction of port 156 by the position of restricting valve 164 serve to control the amount of gas flowing to breathing hose 174. In this respect, restricting valve 164 creates a back pressure on the downstream side of diaphragm 120 and such back pressure operates to position the diaphragm and thus ball valve 140 relative to seat 142 to reduce the pressure of gas flowing across the diaphragm and through the remainder of the gas flow passageway to breathing hose 174. As the pressure of the gas in cylinders 10, 12 and 14 decreases during use of the apparatus, the back pressure against the downstream side of the diaphragm likewise decreases, whereby the ball valve is maintained in a position relative to seat 142 which provides for a constant regulated pressure of supplied breathing gas flowing to breathing hose 174** and the hood or mask being worn by the user.

Figure 8:
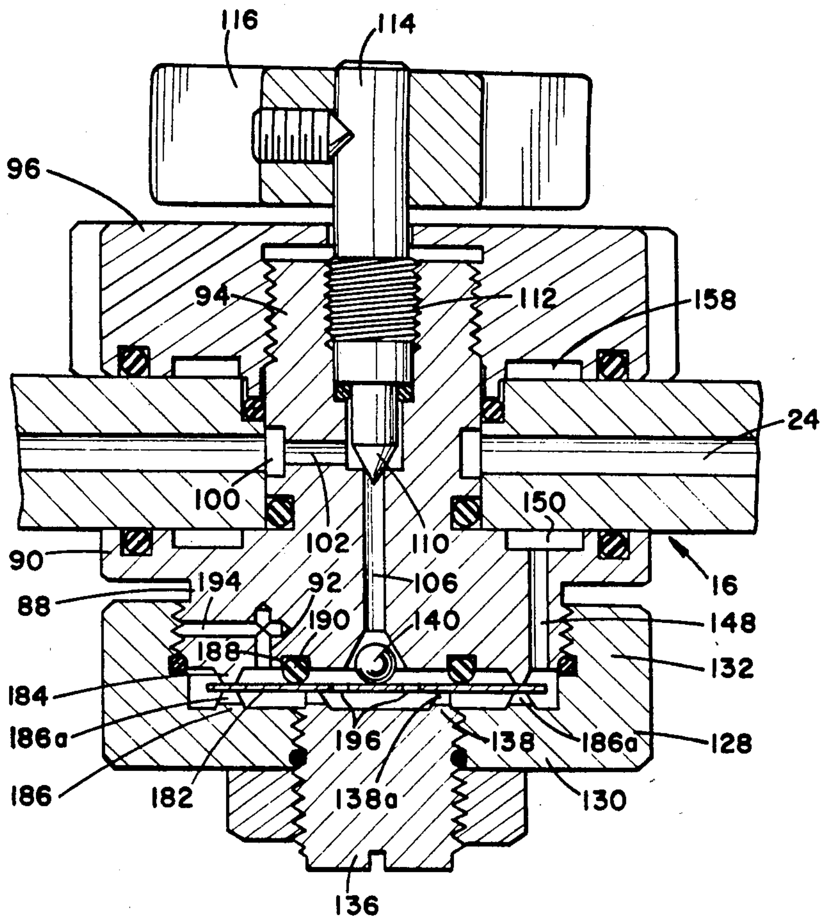

FIG. 8 illustrates a modification of the diaphragm portion of the on-off and pressure reducing valve assembly 18 described hereinabove in connection with the embodiment illustrated in FIGS. 1-7. Accordingly, like numerals appear in FIG. 8 with respect to component parts of the valve assembly corresponding to those previously described. In the embodiment shown in FIG. 8, the lower end of first body member 88 and the axially inner side of end wall 130 of cap member 128 are contoured to cooperatively mount a thin sheet metal circular diaphragm disc 182 beneath and transverse to port 106. More particularly in this respect, the lower end of body member 88 is provided with a circular rib 184 and the inner side of end wall 130 is provided with a circular rib 186 which is in alignment with rib 184 and is cooperable therewith to axially clamp the radially outer periphery of diaphragm disc 182 on the valve body. The lower end of body member 88 is further provided with a circular recess 188 receiving a resilient 0-ring 190 which constantly sealingly engages the upper side of diaphragm 182. The space radially between 0-ring 190 and rib 184 is vented to atmosphere by means of a passageway having an inner portion 192 opening to the latter space and an outer portion 194 opening into the threads between body member 88 and skirt 132 of cap member 128. Diaphragm 182 is provided with a pair of openings 196 therethrough radially inwardly of 0-ring 190 and rib 138 on adjusting screw 132. Rib 186 is provided with radially extending openings 186*a* thereacross and, as described hereinabove in connection with the embodiment of FIGS. 1-7, rib 138 on adjusting screw 136 is provided with radially extending openings 138*a* thereacross.

In operation, assuming operating knob 116 to have been displaced to open port 106 to the flow of breathing gas under pressure from manifold passageway 24, breathing gas flows downwardly through port 106 past ball valve 140, through ports 196 in diaphragm 182, and thence radially outwardly through openings 138*a* and 186*a* to axially extending port 148. While not shown in FIG. 8, it will be appreciated from the description of the embodiment shown in FIGS. 1-7 that flow of breathing gas through port 148 is restricted by a flow restricting valve in the gas flow passageway downstream from port 148, whereby a back pressure is created beneath diaphragm 182. The back pressure acts against the area of the diaphragm within rib 186, whereas the area on the opposite side of the diaphragm acted upon by gas under pressure flowing through port 106 is a smaller area defined by the portion of the diaphragm within 0-ring 190. Accordingly, the back pressure tends to displace diaphragm 182 and thus ball valve 140 upwardly thereby reducing the area between the ball valve and its seat at the lower end of port 106 so as to reduce the pressure of gas flowing through the valve to the breathing tube.

While considerable emphasis has been placed herein on the preferred embodiment of apparatus and the structures and structural interrelationships between the component parts thereof, it will be appreciated that other embodiments of the invention can be made and that changes can be made in the preferred embodiments without departing from the principles of the present invention. In this respect, for example, it will be appreciated that a manifold similar to that in the preferred embodiment could be provided with two compressed air cylinders and a shutoff and flow control valve mounted in the position of the third cylinder. Likewise, it will be appreciated that other shutoff and pressure reducing valve structures can be devised and mounted on the manifold other than in the manner shown. Further, while it is preferred to have a unitary, one-piece manifold and to have the latter relatively flat as shown, it will be appreciated that other manifold arrangements can be devised for mounting a plurality of air cylinders in laterally adjacent relationship together with an air flow control valve assembly thus to obtain the overall compactness and lightness of weight desired. These and other modifications of the preferred embodiments will be suggested or obvious to those skilled in the art from the present disclosure, whereby it is t be distinctly understood that the foregoing descriptive matter is to be interpreted merely as illustrative of the invention and not as a limitation.

Having thus described the invention, it is claimed:

1. A shutoff and pressure reducing valve for controlling the pressure of fluid flow from a source of fluid under pressure comprising valve body means, fluid flow passageway means in said body means and having an inlet end for connection with a source of fluid under pressure and an outlet end, manually operable shutoff valve means including a shutoff valve element supported in said body means to open and close said passageway means downstream from said inlet end, a diaphragm chamber in said fluid flow passageway means downstream of said shutoff valve element, said diaphragm chamber having upstream and downstream ends, said passageway means including a port opening into said upstream end of said chamber, a diaphragm in said chamber transverse to said port, said valve body means including means engaging said diaphragm to bias said diaphragm toward said port, a ball valve element between said diaphragm and port, fluid under pressure from said source displacing said ball element downstream against said diaphragm when said shutoff valve element opens said passageway means, said diaphragm having at least one aperture therethrough, and said fluid flow passageway means including flow restricting means between the downstream end of said diaphragm chamber and said outlet end of said passageway means whereby fluid flowing under pressure from said source through said port and diaphragm aperture to said downstream end of said diaphragm chamber and said flow restricting means provides a back pressure on the downstream side of said diaphragm to control the position of said ball valve element with respect to said port when said shutoff valve element opens said flow passageway means.

2. A valve according to claim 1, wherein said means engaging said diaphragm includes means for adjusting said bias.

3. A valve according to claim 1, wherein said shutoff valve element is coaxial with said port and said diaphragm chamber.

4. A valve according to claim 1, wherein said diaphragm is hat-shaped and comprises an end wall adjacent said upstream end of said chamber, an annular side wall extending downstream from said end wall and having a downstream end in said chamber, and an annular rim extending radially from said downstream end of said side wall, said means engaging said diaphragm engaging said rim to bias said end wall toward said port, said ball valve element being between said end wall and said port, and said aperture being through said end wall.

5. A valve according to claim 1, wherein said diaphragm is planar.

6. A valve according to claim 3, wherein said valve body means has an axis and includes a circular body member having axially opposite first and second ends, said shutoff valve element extending axially into said circular body member from said first end thereof, said diaphragm chamber being in said second end of said circular body member, said port having an upstream end engaged by said shutoff valve element to close said fluid flow passageway means, said inlet end of said passageway means including a radial bore in said circular body member axially between said first and second ends and having an inner end upstream from said upstream end of said port.

7. A valve according to claim 6, wherein said second end of said circular valve body member has an axially outer side, said diaphragm chamber including a circular recess extending into said second end from said outer side, end cap means threadedly interengaging with said second end portion of said body member, annular rib means on said end cap clampingly engaging said diaphragm axially adjacent said outer side, and means engaging said diaphragm to bias said diaphragm including adjusting nut means on said end cap means engaging said diaphragm radially inwardly of said rib means.

8. A valve according to claim 7, wherein said first end of said circular body member is externally threaded and said valve body means includes an annular body member internally threaded for assembly with said threaded first end of said circular body member, said radial bore being axially between said annular body member and said second end of said circular body member when said annular body member is assembled on said threaded second end.

9. A valve according to claim 8, wherein said passageway means further includes an annular outlet recess in said end cap means, an annular outlet recess in said annular body member, an axially extending passageway through said circular body member between said annular outlet recesses, and said outlet end of said passageway means includes an outlet port through said annular body member having an inner end communicating with said outlet recess in said annular body member.

10. A valve according to claim 8, wherein said inlet end of said passageway means includes an annular recess in the outer surface of said circular body member and said radial bore has an outer end opening into said annular recess.

11. A valve according to claim 8, wherein said adjusting nut means includes annular rib means engaging said diaphragm radially inwardly of said rib means on said end cap.

12. A valve according to claim 8, wherein said diaphragm is hat-shaped and comprises an end wall adjacent said upstream end of said chamber, an annular side wall extending downstream from said end wall and having a downstream end in said chamber, and an annular rim extending radially from said downstream end of said side wall, said means engaging said diaphragm engaging said rim to bias said end wall toward said port, said ball valve element being between said end wall and said port, and said aperture being through said end wall.

13. A valve according to claim 8, wherein said diaphragm is planar.

* * * * *